(12) United States Patent
Bennett et al.

(10) Patent No.: US 10,769,576 B2
(45) Date of Patent: Sep. 8, 2020

(54) METHOD AND SYSTEM FOR CARGO LOAD DETECTION

(71) Applicant: BlackBerry Limited, Waterloo (CA)

(72) Inventors: Jesse William Bennett, Apex, NC (US); Zhijun Cai, Ashburn, VA (US); Sandeep Chennakeshu, Austin, TX (US); Scott Leonard Dill, Paris (CA); Mahendra Fuleshwar Prasad, Waterloo (CA); Yu Gao, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 16/419,906

(22) Filed: May 22, 2019

(65) Prior Publication Data

US 2019/0271582 A1    Sep. 5, 2019

Related U.S. Application Data

(63) Continuation of application No. 15/877,194, filed on Jan. 22, 2018, now Pat. No. 10,302,478.

(51) Int. Cl.
*G06Q 10/08* (2012.01)
*G01F 23/292* (2006.01)

(52) U.S. Cl.
CPC ..... *G06Q 10/0833* (2013.01); *G01F 23/2928* (2013.01); *G06Q 10/08* (2013.01)

(58) Field of Classification Search
CPC .. G06Q 10/08; G06Q 10/083; G06Q 10/0833; G01F 23/22; G01F 23/292; G01F 23/2928; G01S 17/08; G06K 9/00
See application file for complete search history.

(56) References Cited

U.S. PATENT DOCUMENTS

| | | | |
|---|---|---|---|
| 6,923,374 B2 | 8/2005 | Knowles et al. | |
| 7,421,112 B2 | 9/2008 | Calver et al. | |
| 7,596,275 B1 | 9/2009 | Richardson et al. | |
| 7,746,379 B2* | 6/2010 | Jesson | G06Q 10/087 348/161 |
| 7,940,955 B2* | 5/2011 | Zhang | G06K 9/3241 382/100 |
| 10,302,478 B1 | 5/2019 | Bennett et al. | |
| 2009/0015400 A1 | 1/2009 | Breed | |
| 2010/0073476 A1 | 3/2010 | Liang et al. | |
| 2013/0342653 A1 | 12/2013 | McCloskey et al. | |
| 2014/0036072 A1 | 2/2014 | Lyall et al. | |
| 2016/0189087 A1 | 6/2016 | Morton et al. | |

OTHER PUBLICATIONS

Office Action dated Sep. 14, 2018; U.S. Appl. No. 15/877,194, filed Jan. 22, 2018; 19 pages.
Notice of Allowance dated Jan. 23, 2019; U.S. Appl. No. 15/877,194, filed Jan. 22, 2018; 7 pages.
European Extended Search Report; Application No. 19153093.0; dated May 17, 2019; 7 pages.

* cited by examiner

*Primary Examiner* — Van T Trieu
(74) *Attorney, Agent, or Firm* — Conley Rose, P.C.; J. Robert Brown, Jr.

(57) ABSTRACT

A method for cargo load detection in a container by a computing device, the method including projecting at least one light dot within an array of light dots towards a surface of the container; capturing an image of the at least one light dot on the surface of the container; and using the captured image to determine cargo loading within the container.

15 Claims, 14 Drawing Sheets

METHOD AND SYSTEM FOR CARGO LOAD DETECTION

CROSS-REFERENCE TO RELATED APPLICATIONS

This application is a continuation of U.S. patent application Ser. No. 15/877,194 filed Jan. 22, 2018 now U.S. Pat. No. 10,302,478, by Jesse William Bennett, et al. entitled "Method and System for Cargo Load Detection", which is incorporated by reference herein as if reproduced in its entirety.

FIELD OF THE DISCLOSURE

The present disclosure relates to the transportation of goods, and in particular relates to cargo load measurement of containers or trailers for the transportation of goods.

BACKGROUND

During the transportation of goods, it is very valuable to know which trailers or shipping containers are full, and which ones are empty. It is also useful to know, for those containers that are loaded, how full or empty the container is. However, in practice this information is difficult to obtain.

A yard check is one way in which trailer loading is determined. This is a manual process in which a yard worker opens a container or trailer to determine its loading status. However, this method takes up a significant amount of time and human resources.

Automatic load detection may be possible. Trailer cargo detection devices in the market today typically use ultrasonic or light sensors to measure the distance from the load to the measurement device using time of flight (TOF) technology. However, load surface conditions, temperature, and device field-of-view create problems which are difficult to solve.

BRIEF DESCRIPTION OF THE DRAWINGS

The present disclosure will be better understood with reference to the drawings, in which.

DETAILED DESCRIPTION OF THE DRAWINGS

Figure 1:
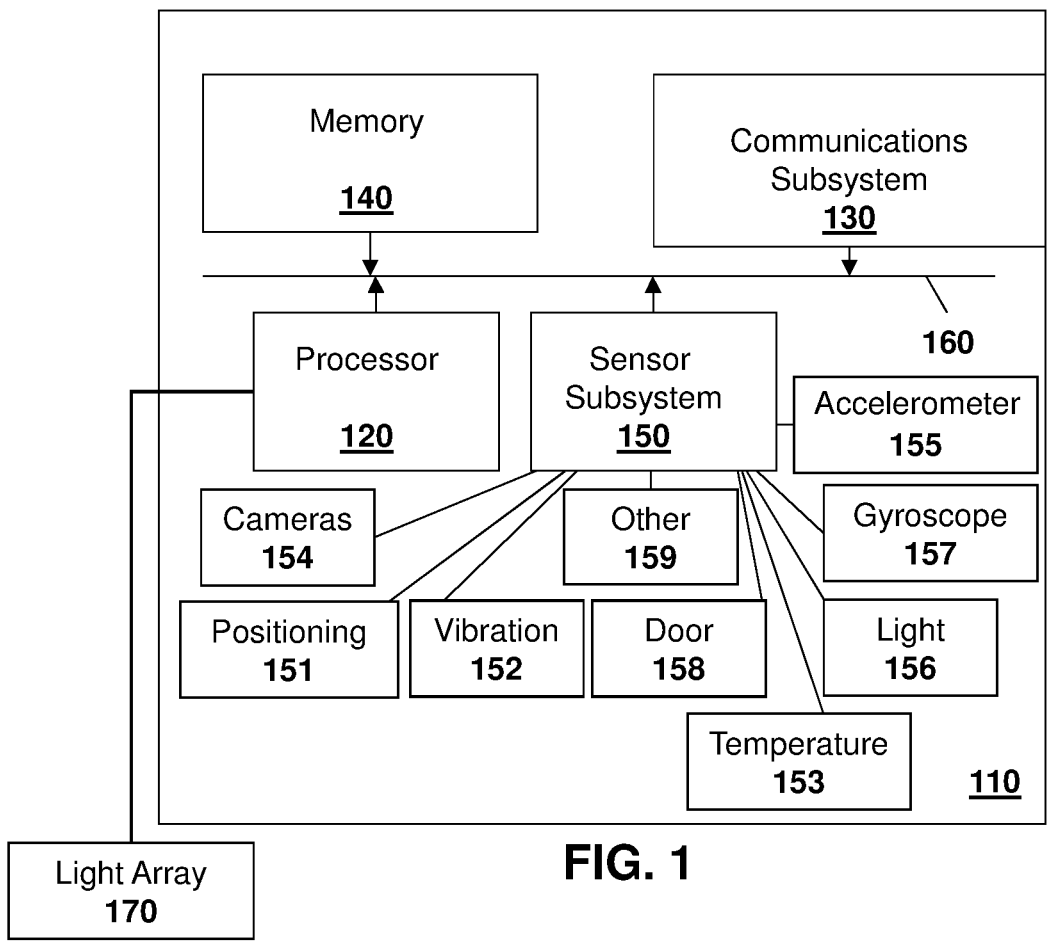
FIG. 1 is block diagram of an example computing device capable of being used between embodiments of the present disclosure.

The present disclosure provides a method for cargo load detection in a container by a computing device, the method comprising: projecting at least one light dot within an array of light dots towards a surface of the container; capturing an image of the at least one light dot on the surface of the container; and using the captured image to determine cargo loading within the container.

The present disclosure further provides a computing device for cargo load detection in a container, the computing device comprising: a processor; and a communications subsystem, wherein the computing device is configured to: project at least one light dot within an array of light dots towards a surface of the container; capture an image of the at least one light dot on the surface of the container; and use the captured image to determine cargo loading within the container.

The present disclosure further provides a computer readable medium for storing instruction code for cargo load detection in a container, the instruction code, when executed by a processor of the computing device causing the computing device to: project at least one light dot within an array of light dots towards a surface of the container; capture an image of the at least one light dot on the surface of the container; and use the captured image to determine cargo loading within the container.

Therefore, in accordance with the embodiments described below, camera-based techniques for load detection determination are described.

In a first embodiment, a light array load detection system is provided. In particular, the light array may be mounted within the trailer or container in one embodiment, and may project an array of dots through the trailer. The dots may appear as a pattern of light on one or more surfaces within the trailer. Once the system is calibrated, a camera that is associated with the light array may capture and provide an image of the dots. Image processing of the dots may be used to detect shifting and distortion of the dots, which indicates a presence of a load. Calculations may be based on the locations of dots together in one embodiment to determine the position and size of such load.

In a further embodiment, calculations may be based on individual dots or subsets of dots. The results of the calculations can then be combined in order to determine the position and size of such load.

In an alternative embodiment, camera based load detection may be used to find edges within a container or trailer. A typical container, when empty, is merely a box with known dimensions. In this regard, the embodiment may detect the edges of such box. Subsequently, when the trailer is loaded, the edge detection may detect interruptions in the edges and can use the interruptions of the various planes within the container in order to determine the position and size of the load.

Each embodiment is described in more detail below.

Apparatus

In accordance with the embodiments of the present disclosure, an image sensing apparatus with communication capabilities may be installed within a trailer or shipping container. Such apparatus may be any general computing device with the capability of capturing images. In some embodiments below the image sensing apparatus may be configured to provide a light array. Further, the image sensing apparatus in the embodiments herein may be configured for communicating images or calculation results to a server.

One computing device for a vehicle or container is shown with regard to FIG. 1. The computing device of FIG. 1 is however merely an example and other computing devices could equally be used in accordance with the embodiments of the present disclosure.

Reference is now made to FIG. 1, which shows an example computing device 110. Computing device 110 can be any device or network node. Such computing device or network node may include any type of electronic device, including but not limited to, mobile devices such as smartphones or cellular telephones. Examples can further include fixed or mobile devices, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, among others.

Computing device 110 comprises a processor 120 and at least one communications subsystem 130, where the processor 120 and communications subsystem 130 cooperate to perform the methods of the embodiments described herein. Communications subsystem 130 may, in some embodiments, comprise multiple subsystems, for example for different radio technologies.

Communications subsystem 130 allows computing device 110 to communicate with other devices or network elements. Communications subsystem 130 may use one or more of a variety of communications types, including but not limited to cellular, satellite, Bluetooth™, Bluetooth™ Low Energy, Wi-Fi, wireless local area network (WLAN), near field communications (NFC), IEEE 802.15, wired connections such as Ethernet or fiber, among other options.

As such, a communications subsystem 130 for wireless communications will typically have one or more receivers and transmitters, as well as associated components such as one or more antenna elements, local oscillators (LOs), and may include a processing module such as a digital signal processor (DSP) or System on Chip (SOC). As will be apparent to those skilled in the field of communications, the particular design of the communication subsystem 130 will be dependent upon the communication network or communication technology on which the computing device is intended to operate.

Processor 120 generally controls the overall operation of the computing device 110 and is configured to execute programmable logic, which may be stored, along with data, using memory 140. Memory 140 can be any tangible, non-transitory computer readable storage medium, including DRAM, Flash, optical (e.g., CD, DVD, etc.), magnetic (e.g., tape), flash drive, hard drive, or other memory known in the art.

Alternatively, or in addition to memory 140, computing device 110 may access data or programmable logic from an external storage medium (not shown), for example through communications subsystem 130.

In the embodiment of FIG. 1, computing device 110 may utilize a plurality of sensors, which may either be part of computing device 110 in some embodiments or may communicate with computing device 110 in other embodiments. For internal sensors, processor 120 may receive input from a sensor subsystem 150.

Examples of sensors in the embodiment of FIG. 1 include a positioning sensor 151, a vibration sensor 152, a temperature sensor 153, one or more image sensors/cameras 154, accelerometer 155, light sensors 156, gyroscopic sensors 157, a door sensor 158, and other sensors 159. Other sensors may be any sensor that is capable of reading or obtaining data that may be useful for the computing device 110. However, the sensors shown in the embodiment of FIG. 1 are merely examples, and in other embodiments different sensors or a subset of sensors shown in FIG. 1 may be used. For example, in some cases the only sensor may be an image sensor.

Communications between the various elements of computing device 110 may be through an internal bus 160 in one embodiment. However, other forms of communication are possible.

In accordance some of the embodiments of the present disclosure, a light array 170 may be controlled by computing device 110. Light array 170 may, for example, be mounted together with computing device 110 or may form part of computing device 110. Light array 170 may project an array of dots in any light spectrum, including visible light, ultraviolet (UV) light, or infra-red (IR) light, in some embodiments.

Computing device 110 may be affixed to any fixed or portable platform. For example, computing device 110 may be affixed to shipping containers or truck trailers in one embodiment. In other embodiments, computing device 110 may be affixed to any vehicle for which loading status is needed, including self-propelled vehicles (e.g., automobiles, cars, trucks, buses, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising, among others.

In other cases, computing device 110 may be part of a container that could be carried on or within a vehicle. In accordance with the present disclosure, the term container may include any sort of cargo or item transportation such as vehicles, intermodal containers, aircraft shipping bins, lock boxes, and other similar vessels.

Such a computing device 110 may be a power limited device. For example, computing device 110 could be a battery operated device that can be affixed to a shipping container or trailer in some embodiments. Other limited power sources could include any limited power supply, such as a small generator or dynamo, a fuel cell, solar power, energy harvesting, among other options.

In other embodiments, computing device 110 may utilize external power, for example from the engine of a tractor pulling the trailer, from a land power source for example on a plugged in recreational vehicle or from a building power supply, among other options. Thus, the computing device 110 may also be connected to a power cord that receives its power from a power source.

External power may further allow for recharging of batteries to allow the computing device 110 to then operate in a power limited mode again. Recharging methods may also include other power sources, such as, but not limited to, solar, electromagnetic, acoustic or vibration charging.

The computing device from FIG. 1 may be used in a variety of environments. One example environment in which the computing device may be used is shown with regard to FIG. 2.

Figure 2:
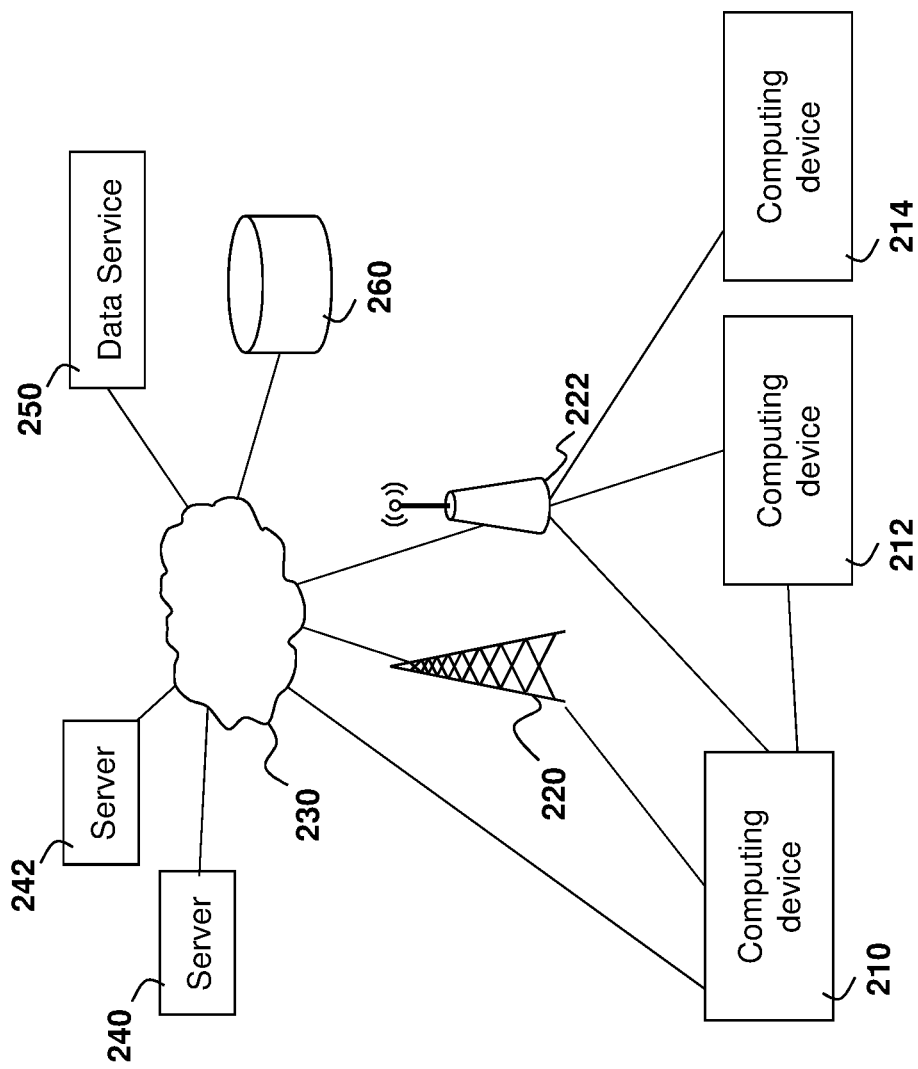
FIG. 2 is a block diagram showing an example architecture for the computing device of FIG. 1.

Referring to FIG. 2, three computing devices, namely computing device 210, computing device 212, and computing device 214 are provided.

In the example of FIG. 2, computing device 210 may communicate through a cellular base station 220 or through an access point 222. Access point 222 may be any wireless communication access point.

Further, in some embodiments, computing device 210 could communicate through a wired access point such as Ethernet or fiber, among other options.

The communication may then proceed over a wide area network such as Internet 230 and proceed to servers 240 or 242.

Similarly, computing device 212 and computing device 214 may communicate with servers 240 or server 242 through one or both of the base station 220 or access point 222, among other options for such communication.

In other embodiments, any one of computing devices 210, 212 or 214 may communicate through satellite communication technology. This, for example, may be useful if the computing device is travelling to areas that are outside of cellular coverage or access point coverage.

In other embodiments, computing device 212 may be out of range of access point 222, and may communicate with computing device 210 to allow computing device 210 to act as a relay for communications.

Communication between computing device 210 and server 240 may be one directional or bidirectional. Thus, in one embodiment computing device 210 may provide information to server 240 but server 240 does not respond. In other cases, server 240 may issue commands to computing device 210 but data may be stored internally on computing device 210 until the sensor apparatus arrives at a particular location, possibly during a particular time window. In other cases, two-way communication may exist between computing device 210 and server 240.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of computing devices 210, 212, 214, etc. For example, the server may be located essentially anywhere so long as it has network access to communicate with computing devices 210, 212, 214, etc.

Server 240 may, for example, be a fleet management centralized monitoring station. In this case, server 240 may receive information from a sensor apparatus associated with various trailers or cargo containers, providing information such as the location of such cargo containers, the temperature within such cargo containers, any unusual events including sudden decelerations, temperature warnings when the temperature is either too high or too low, cargo loading within the trailer, among other data. The server 240 may compile such information and store it for future reference.

Other examples of functionality for server 240 are possible.

In the embodiment of FIG. 2, servers 240 and 242 may further have access to third-party information or information from other servers within the network. For example, a data services provider 250 may provide information to server 240. Similarly, a data repository or database 260 may also provide information to server 240.

For example, data services provider 250 may be a subscription based service used by server 240 to obtain current road and weather conditions, or may be an inventory control system in some cases.

Data repository or database 260 may for example provide information such as image data associated with a particular location, aerial maps, detailed street maps, or other such information.

The types of information provided by data service provider 250 or the data repository or database 260 is not limited to the above examples and the information provided could be any data useful to server 240.

In some embodiments, information from data service provider 250 or the data repository from database 260 can be provided to one or more of computing devices 210, 212, or 214 for processing at those sensor apparatuses.

A computing device such as that described in FIGS. 1 and 2 above may be used to find the loading of a container or trailer. As described above, in various embodiments of the present disclosure this may be done based on a light array or based on container edge detection.

Light Array

In accordance with one embodiment of the present disclosure, a combination of a light array and a camera may be used for a load detection system. In particular, in one embodiment an infrared (IR) light array is utilized. Such IR array is used in the examples below. However, in other embodiments different wavelengths of light are possible, either visible or non-visible. The present disclosure is therefore not limited to infrared.

Figure 3:
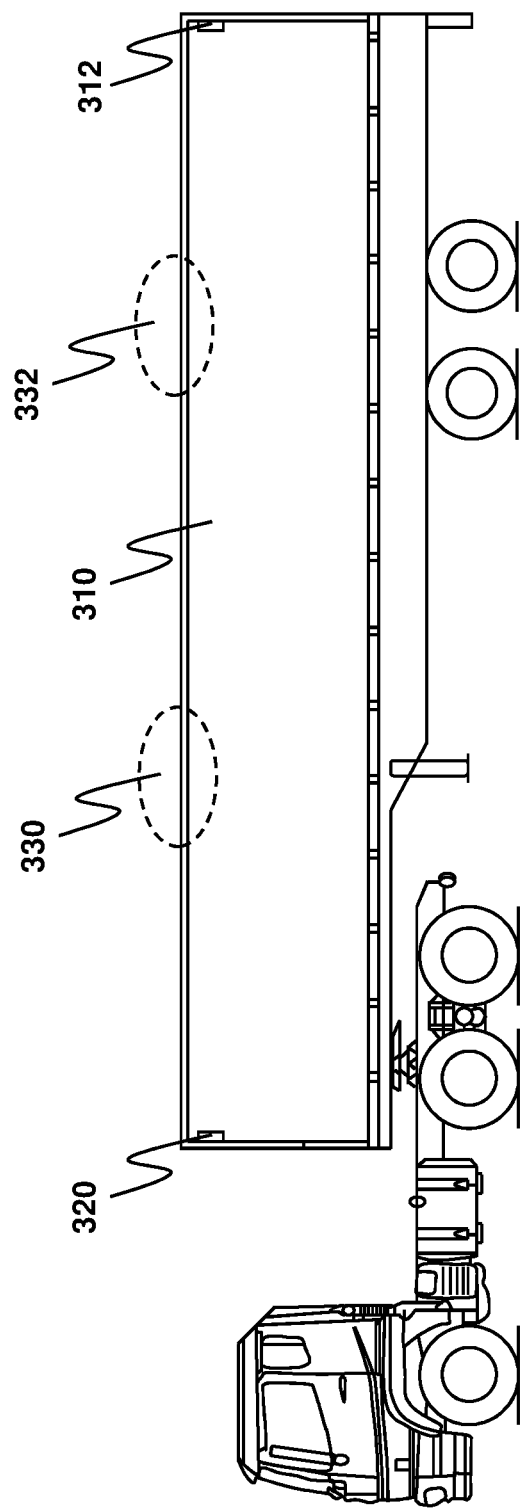
FIG. 3 is a side elevational view of a container showing example placements of the computing device.

A computing device, such as that described above with regard to FIG. 1, may be mounted inside of a trailer or cargo container. Reference is now made to FIG. 3.

In the embodiment of FIG. 3, example truck trailer 310 is shown. In one embodiment, the computing device may be mounted on the back of the trailer. For example, in one embodiment the IR array may be located in the same housing as the camera and mounted close to the top of the back door or on the rear side wall near the back door of the truck trailer 310. This is shown, for example, with computing device 312 in the embodiment of FIG. 3.

The location of computing device 312 assumes that loading in a trailer is typically done from the front to the back. In this way, a camera and IR array located in such position may detect cargo as it is loaded from the front to the back of the trailer.

However, in other cases it may be beneficial to have a different position for the computing device. Further, in some embodiments it may be useful to have a plurality of such computing devices within the trailer 310.

Thus, for example, in the embodiment of FIG. 3, a computing device may optionally be located at position 320, which is at the front of the trailer. Such computing device located at position 320 may detect loading at the rear of the trailer and may be used alone or in conjunction with a computing device 312.

In other embodiments, one or more computing devices may be located at positions 330 or 332, which is on the ceiling of the trailer. In such case, the light array would typically project downwards to the deck of the trailer. In some other embodiments, multiple computing devices may be positioned in the lower portion of the back door or front door in order to get a more accurate estimation of the empty space.

Computing devices 312, 320, 330 or 332 may be used alone in some embodiments, or may be combined into sets of two or more computing devices and/or external sensors for load calculation.

Other options for the positioning of the camera and IR array are possible.

Detection of Trailer Loading

In accordance with the IR array example, detection of trailer loading may be done by projecting a IR dot array to the front wall of the trailer or cargo container when such computing device is mounted at the rear of the trailer. As will be appreciated by those skilled in the art, the IR dot array would be projected to the rear of the trailer if the IR array is mounted at the front of the trailer or towards the floor of the trailer if the IR array is mounted at the ceiling.

Figure 4:
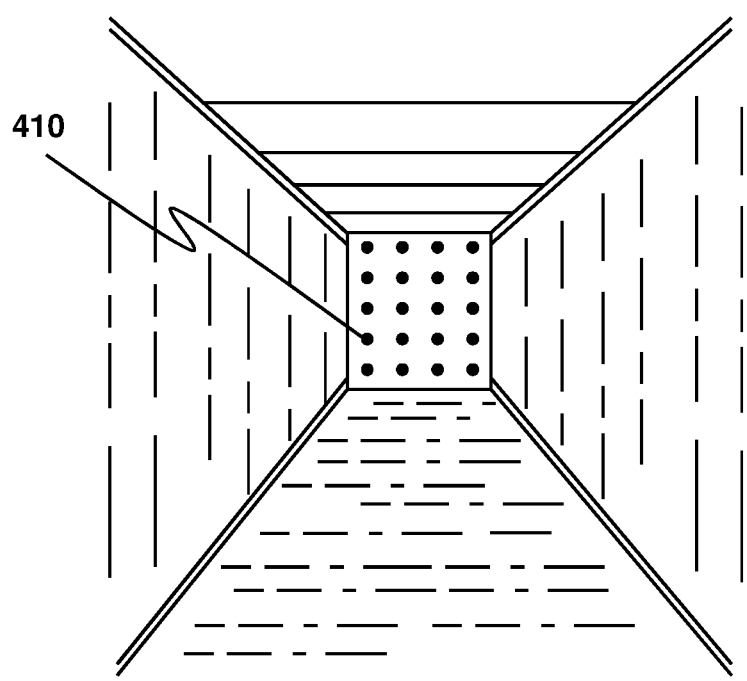
FIG. 4 is a front perspective view of the inside of an empty container having a light array projected onto a surface thereof.

Reference is now made to FIG. 4 in which a dot array 410 is projected to the front of an empty trailer. In the embodiment of FIG. 4, the dot array 410 is a 5×4 array for simplicity. However, in practical embodiments, the number of dots that is projected could be varied based on the desired accuracy for the load detection. A larger number of dots will be able to detect load sizes more accurately. However, such larger number of dots will also require more processing.

In some other embodiments, the dot array may be not only projected to the front wall of the trailer but also projected to the side wall/top/bottom near the front wall, which can give more flexibility when determining the loading. For example, when the dot array is projected to extend to the side wall/top/bottom near the front wall, this provides more dots, which increases the measurement accuracy if all the dots are used for the calculation. Secondly, by projecting to the side wall/top or bottom, the system could tolerate some potential misalignments. For example, after some time, some dots which are intended to project to the front wall may be shifted out of the front wall (on to the side wall/top/bottom) due to a minor shift of the light array. In the embodiment providing redundancy dots nearby the front wall, the front wall is still fully covered by the dots. This configuration may be achieved with a single array or multiple independent arrays.

Once a computing device is installed and calibrated in a trailer or container, the projection of dot array 410 on to the front of the trailer allows for the detection of an empty trailer. Specifically, given the known size of the trailer, the known position of the camera and the known position of the IR array, the relative distance and position of the dot array at the front wall can be predetermined using algorithms. By comparing the dot array in an image in a predetermined dot array position or distances, an empty trailer could be detected.

In particular, in one embodiment, a calibration image may be stored at a server and an image taken by the computing device may then be sent to the server for the calculation of the load size. This may be done, for example, if the computing device associated with the camera and IR array has limited power resources or computing resources.

However, in other embodiments, the computing device associated with the IR array may perform some processing or preprocessing of the image captured by the camera before sending data to the server.

Thus, in the embodiment of FIG. 4, dot array 410 will project the dots to the calibrated positions for an empty trailer and therefore a comparison at either the computing device or server will determine that the trailer is empty.

Figure 5:
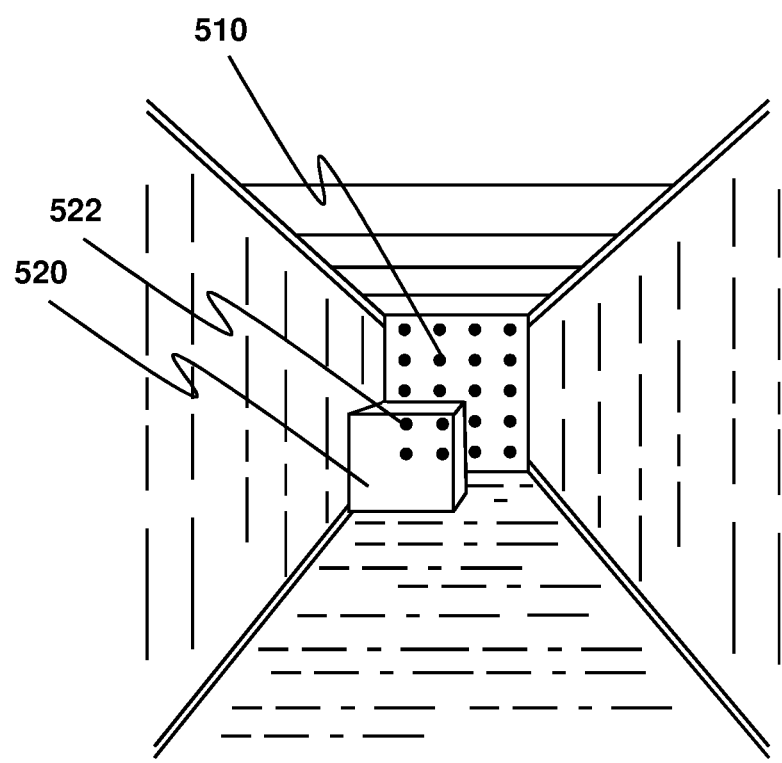
FIG. 5 is a front perspective of the inside of a loaded container having a light array projected onto a surface thereof.

Reference is made to FIG. 5. When there is a load in the trailer, the IR array projects the dot array to the front wall (or the front wall with nearby side walls/top/bottom). Due to load, the position and relative distances of the dots within the dot array are distorted. In particular, as seen in the embodiment of FIG. 5, the light array 510, when projected towards the front wall of the trailer, is interrupted by load 520. Therefore, the dots 522 that intersect with the load 520 are distorted from those that would be seen for an empty trailer.

Figure 6:
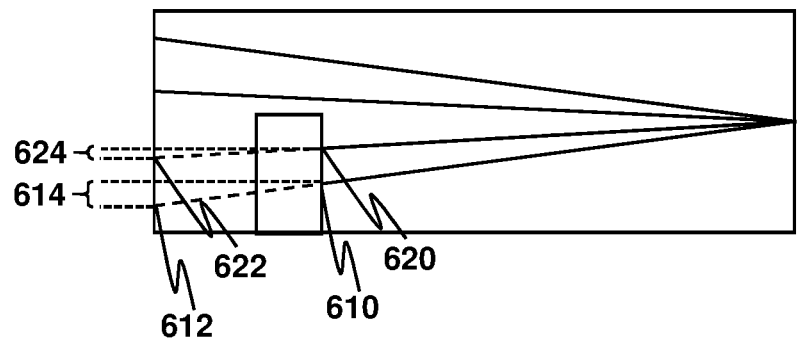
FIG. 6 is a top plan view of a light array being projected within a container having a load therein.

Referring to FIG. 6, the figure shows a top view of the light array projection in the container with a load. As seen in FIG. 6, intersection dot 610 is shifted from the expected intersection dot 612 which would occur if the trailer was empty. The shift is shown by distance 614 in the embodiment of FIG. 6.

Similarly, the intersection dot 620 for a second dot is also different than the expected dot 622 for an empty load with a distance difference of 624.

Figure 7:
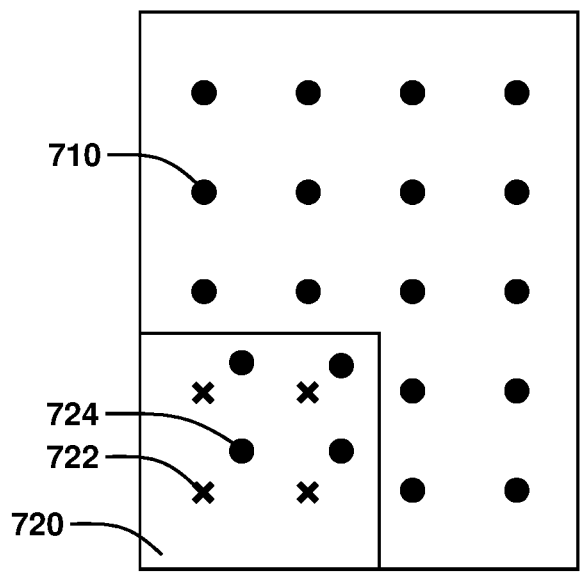
FIG. 7 is a front elevational view showing a light array projection onto a surface of a container and having a distortion based on a load within the container.

Further, referring to FIG. 7, the array 710 shows the dot positions in the expected position for an empty trailer. However, due to a load 720, the expected positions 722 for dots in an empty trailer are not present within an image and instead, actual positions 724 are captured. In the embodiment of FIG. 7, an "X" is shown for the expected empty position of each dot.

Thus, based on FIGS. 5, 6 and 7, a camera associated with the computing device takes an image of the trailer interior. Analysis of such image detects dot array distortion created by the load. When analyzing the relative distance and position of each dot utilizing algorithms as described below, the load position and shape may be mapped out.

Analysis of the image may be done either at the computing device or on the server side if the image is uploaded to the server.

As with the example of FIG. 4, in the embodiment of FIG. 7 a 5×4 dot array is shown. However, if a higher-resolution dot array such as a 10×10 dot array was provided, this would give better details of the load, shape and position. Thus, in general, with the increase of the number of dots, the detection accuracy will increase.

Distortion Calculation

Each dot in the dot array may be analyzed to determine its distance from the front or rear of the trailer.

Figure 8:
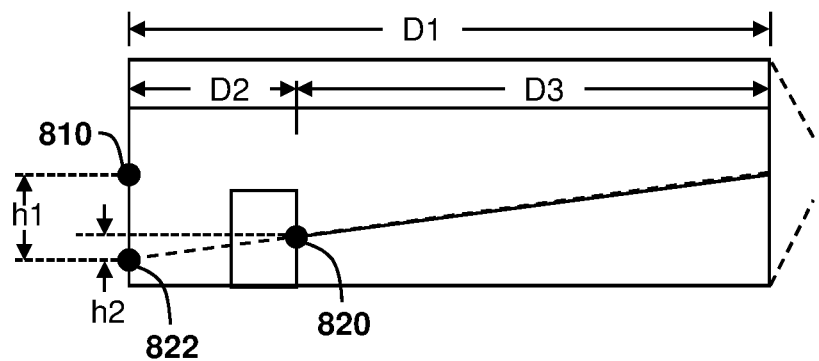
FIG. 8 is a top plan view of the distortion of a light dot within the light array based on a cargo load.

In accordance with one embodiment, if the IR array is mounted at the rear of the trailer, then a reference dot 810, as seen in the embodiment of FIG. 8, may be used as a reference. Specifically, reference dot 810 is the dot that the IR array projects straight ahead on the front wall, where the projection of the reference dot is perpendicular to the IR array mounting surface. In FIG. 8, the reference dot (and IR array mounting) is shown in a substantially central position with respect to the width of the trailer, but this is not necessary.

Figure 9:
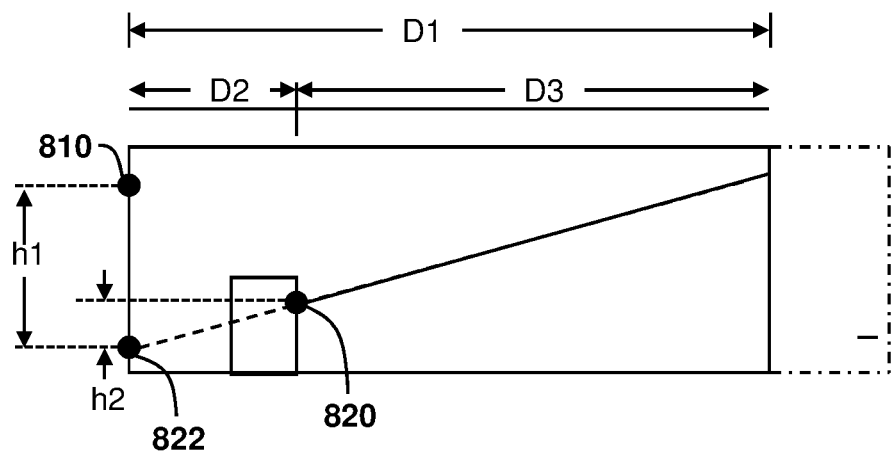
FIG. 9 is a side elevation view of the distortion of a light dot within the light array based on a cargo load.

FIG. 8 shows a top view and FIG. 9 shows a side view of a trailer. Taking these planes individually, either the horizontal or vertical distortion can be determined. In particular, in FIGS. 8 and 9, D1 is the length of the trailer. D2 is the distance from the front wall to the front of the load as measured by the particular dot being analyzed.

D3 is the distance from the rear of the trailer to the front of the load for a particular dot being measured.

In the embodiments of FIGS. 8 and 9, the distances D2 and D3 are found for each dot in the array so that the load shape and position and may be mapped out.

In particular, referring to FIG. 8, the distorted dot 820 is shifted horizontally from the expected position 822. This shift is referred to as "h2".

Further, the distance from the expected position 822 and the reference dot 810 is referred to as "h1".

If calculating based on vertical distortion, reference is made to FIG. 9. In the embodiment of FIG. 9, the distorted dot 820 is distorted from the expected position 822 by a distance "h2". Further, the vertical distance between reference dot 810 and the expected position 822 is referred to as "h1".

Based on such proportions, the distances to the load may be derived as shown in equations 1 and 2 below.

$$D2 = D1 * h2/h1 \quad (1)$$

and $$D3 = D1 * (h1-h2)/h1 = D1 - D2 \quad (2)$$

Using equation 1 above, the distance from the front of the trailer to the front of the load is found. Using equation 2 above, the distance from the rear of the trailer to the front of the load is found. In the equations, D1 is the length of the trailer.

The ratio of h2/h1 can be determined by the comparison of the distorted image and the reference image.

Equations 1 and 2 could equally be used with the vertical distortion of FIG. 9.

Figure 10:
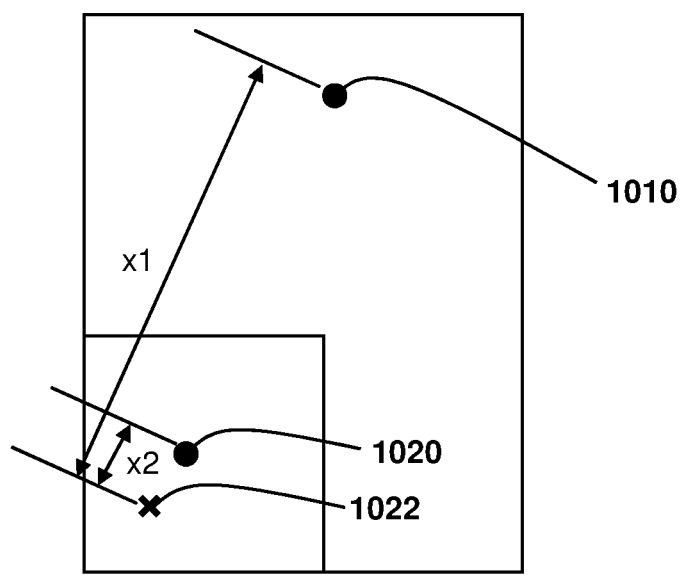
FIG. 10 is a block diagram showing calculations on an image of a light projection distorted by a load.

Utilizing the principles of FIGS. 8 and 9 above, image processing may be used to find the load positioning. Reference is now made to FIG. 10, which shows an image that may be analyzed by a computing device or server.

In the embodiment of FIG. 10, a reference dot 1010 is an image representation for reference dot 810.

Similarly, the distorted dot 1020 is an image representation of the distorted dot 820. Further, the expected position 1022 in a reference image represents the expected position 822.

In the embodiment of FIG. 10, the distance between the reference dot and the expected position is referred to as "x1" and may be pre-calculated for each dot within the dot array matrix.

The distance between the distorted dot and the expected position is referred to as "x2" in the embodiment of FIG. 10. x2 may be determined through image processing of the image of FIG. 10.

The ratios may be determined in accordance with the equation 3 below.

$$x2/x1 = h2/h1 \quad (3)$$

As seen in equation 3, the ratios between x2 and x1 correspond with the ratios between h2 and h1.

Therefore, distances to the load may be determined based on equations 4 and 5 below.

$$D2 = D1 * x2/x1 \quad (4)$$

and $$D3 = D1 * (x1-x2)/x1 = D1 - D2 \quad (5)$$

Based on equations 4 and 5 above, the distance D2 and D3 may be found.

As described below, a computing device, whether the computing device associated with the IR array or the server, may therefore calculate the distorted distance for each dot in the array and then compile the results of the calculations in order to create a map of the load shape and position.

The processing for FIG. 10 may be done by any computing device. In particular, the computing device associated with the IR array may perform the image processing in one embodiment. In another embodiment, the image processing may be performed at a server.

Figure 11:
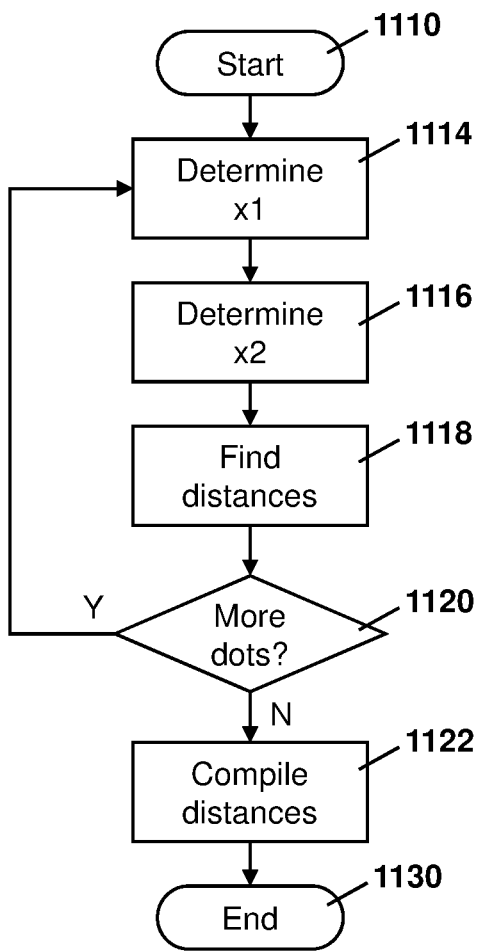
FIG. 11 is a process diagram showing the finding of distances and compiling upload data within a container.

Image processing at a computing device, for example, is shown with regard to FIG. 11.

The process of FIG. 11 starts a block 1110 and proceeds to block 1114 in which the computing device that is processing the image may determine x1. The determination of x1 may be based on prestored values for the distance between the reference dot and the undistorted dot. A plurality of x1 measurements may therefore be stored in a lookup table at the computing device, and may be applied depending on the dot being processed.

In other embodiments, the image processing at block 1114 may require the determination of x1 based on a reference image.

From block 1114, the process proceeds to block 1116 in which the value of x2 is determined. The value of x2 may be determined based on the location of the distorted dot within the image being processed. For example, the undistorted dot may be overlaid over the distorted dot and the distance between the two calculated.

The process then proceeds to block 1118 in which the distances D2 and D3 are found utilizing, for example, equations 4 and 5 above.

From block 1118, the process proceeds to block 1120 and checks whether more dots need to be processed. In particular, the process of FIG. 11 may be used for analyzing all of the dots within the image.

Therefore, based on the check at block 1120, if it is determined that more dots need to be processed then the process proceeds back to block 1114 in which another dot is chosen for the calculations.

Once all the dots have been processed, the process proceeds from block 1120 to block 1122 in which the shape and distance to the load is compiled based on the calculation for each of the individual dots. In particular, after the distance for each distorted dot is calculated, the compilation at block 1122 may map out the load shape and position.

From block 1122, the process proceeds to block 1130 and ends.

Figure 12:
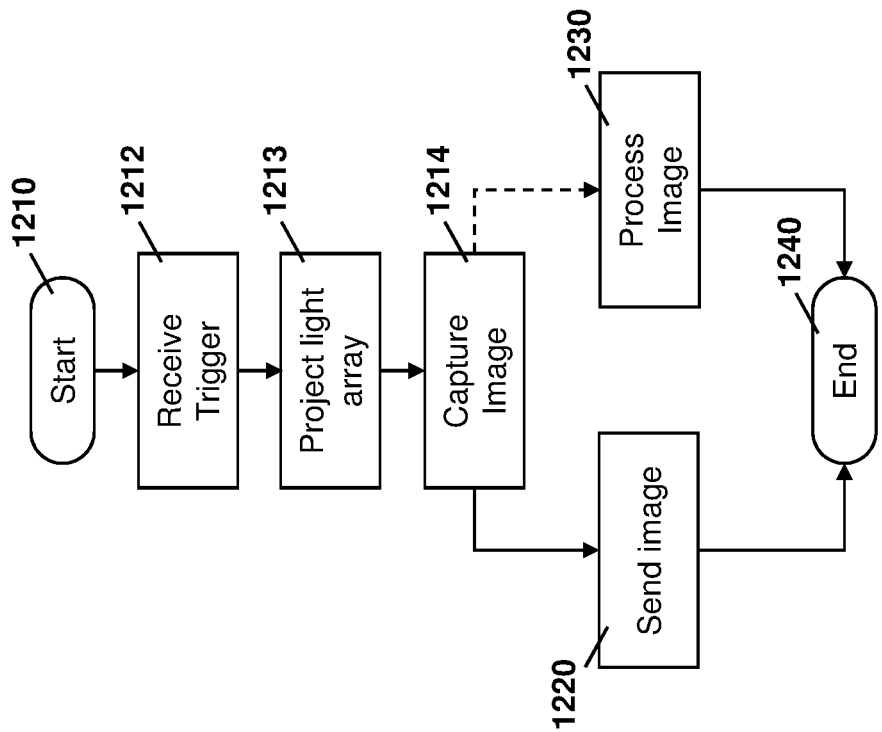
FIG. 12 is a process diagram showing the process of a computing device for capturing load information.

At the computing device associated with the IR array, the process for obtaining the image and then either processing it or sending it to a sever is shown with regard to FIG. 12.

In particular, the process of FIG. 12 starts at block 1210 and proceeds to block 1212 in which the computing device associated with the IR array receives a trigger. Such trigger may be any signal or sensor reading which may cause the load determination algorithm to be started. For example, the trigger at block 1212 may be a signal from a server asking the computing device in the container for a load status.

In other embodiments, the trigger at block 1212 may involve a sensor such as a door closing sensor indicating that the door has been opened or closed. In other cases, the trigger at block 1212 may be a light sensor within the container indicating that the light level has changed within the container, indicating the trailer has gone from an open status to a closed status. In some embodiments, it is preferable to determine cargo loading when the container is closed since this is indicative that loading has been completed and is not ongoing. In other embodiments, the trigger at block 1212 may be a vibration sensor that may detect whether something has been loaded or removed from the container. In other embodiments, the trigger at block 1212 may be a timer, i.e., periodically triggered. Other options for such trigger are possible.

Based on the trigger, the process then proceeds to block 1213 in which the light array is projected and then to block 1214 in which the computing device captures an image of the IR array.

From block 1214 the process proceeds to either block 1220 or 1230. Further, in some embodiments, processing can be distributed. Specifically, processing may be done at the computing device, gateway and server. Image compression techniques can be used to send data from the computing device to a server or from the computing device to a gateway and from the gateway to a server.

In particular, if the processing is being performed at a server, then the process may proceed to block 1220 in which is the image with the IR array is sent to a server for processing. The server would perform processing similar to the processing of FIG. 11.

Alternatively, if the processing is being performed at the computing device, then the process proceeds to block 1230 in which the image is processed. Such image processing may utilize the process of FIG. 11, for example.

From block 1220 or block 1230 the process proceeds to block 1240 and ends.

Figure 13:
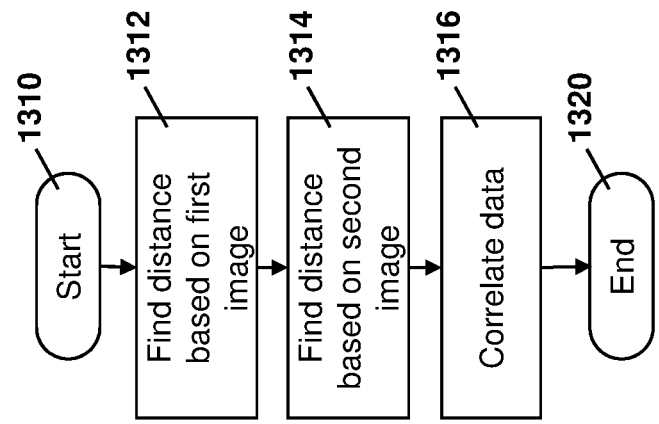
FIG. 13 is a process diagram showing the compiling of data from a plurality of light arrays.

In one embodiment, a plurality of computing devices with IR arrays may exist within a trailer. In this case, the distance calculations may be performed based on each of the IR arrays and then the results combined. Reference is now made to FIG. 13.

In the embodiment of FIG. 13, the process starts at block 1310 and proceeds to block 1312 in which the distances for each dot in the first IR array is processed. In particular, the processing at block 1312 may use the process of FIG. 11 for the first IR array.

The process next proceeds to block 1314 in which distances based on the dots in a second IR array are calculated. Again, the process of FIG. 11 could be used at the block 1314 for finding the distances for the second IR array.

From block 1314, the process proceeds to block 1316 in which the data for the two IR arrays is correlated. In particular, if the distance from a load to the rear of the trailer is a first distance and the distance from the load to the front of the trailer is a second distance, this may indicate that the load is within the center of the trailer and its volume may therefore be calculated based on the plurality of IR measurements in one case.

From block 1316, the process proceeds to block 1320 and ends.

In a further alternative embodiment, instead of projecting the entire dot array on the front wall at the same time, the IR array could illuminate a subset of dots, including one dot at a time or a few dots at a time. A camera could then take the image for each. By comparing such images with reference image, the distortion could then be determined for the eliminated dots or a subset of dots. The process would then continue to illuminate the next dot or the next subset of dots until all the dots have been projected.

Such alternate embodiment may be advantageous, for example, if it is difficult to determine the undistorted dot position for a particular distorted dot. For example, with odd load shapes, the distortion may be so great that it may be difficult to determine where an expected dot position for a particular IR dot in an image is.

Figure 14:
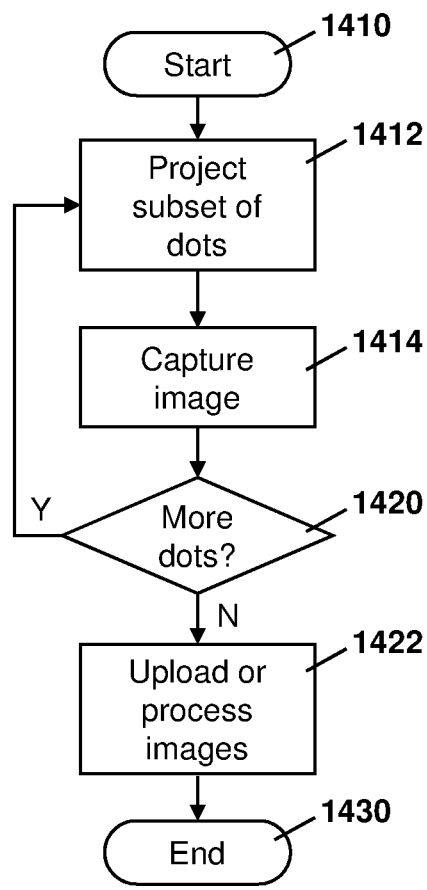
FIG. 14 is a process diagram showing the projection and capturing of subsets of light dots within the light array.

Therefore, reference is now made to FIG. 14. In the embodiment of FIG. 14 the process starts up block 1410 and proceeds to block 1412 in which a subset of dots is projected from the IR array. Such subset of dots may be anything from one dot to some number that is less than the entire IR array.

The process then proceeds to block 1420 in which the image is captured for the subset of dots.

The process then proceeds to block 1422 in which a check is made to determine whether all of the IR array dots have now been captured. If not, the process proceeds back to block 1412 in which a different subset of dots made then be projected.

If all of the dots have now been captured, the process proceeds to block 1430 in which the images captured are uploaded or processed by the computing device.

The process then proceeds to block 1440 and ends.

Based on FIG. 14, instead of projecting the whole dot array on the front of the wall of the same time, the IR array could therefore illuminate one dot or a subset of dots at a time and the camera could take an image. By comparing the reference image, the distortion could then be determined for the illuminated dot or dots, and it may be easier to determine where the expected position for such dots are.

The embodiments of FIGS. 4 to 14 therefore show a cargo loading determination technique utilizing an image capture device and a projected light array.

Camera Based Edge Detection

In a further embodiment, rather than or in addition to using an IR array, edge detection may be used to estimate the loading of a trailer. As with FIG. 3 above, a camera may be located at the rear of the trailer projecting forward. In other embodiments, the camera may be at the front of the trailer or on the top of the trailer.

Figure 15:
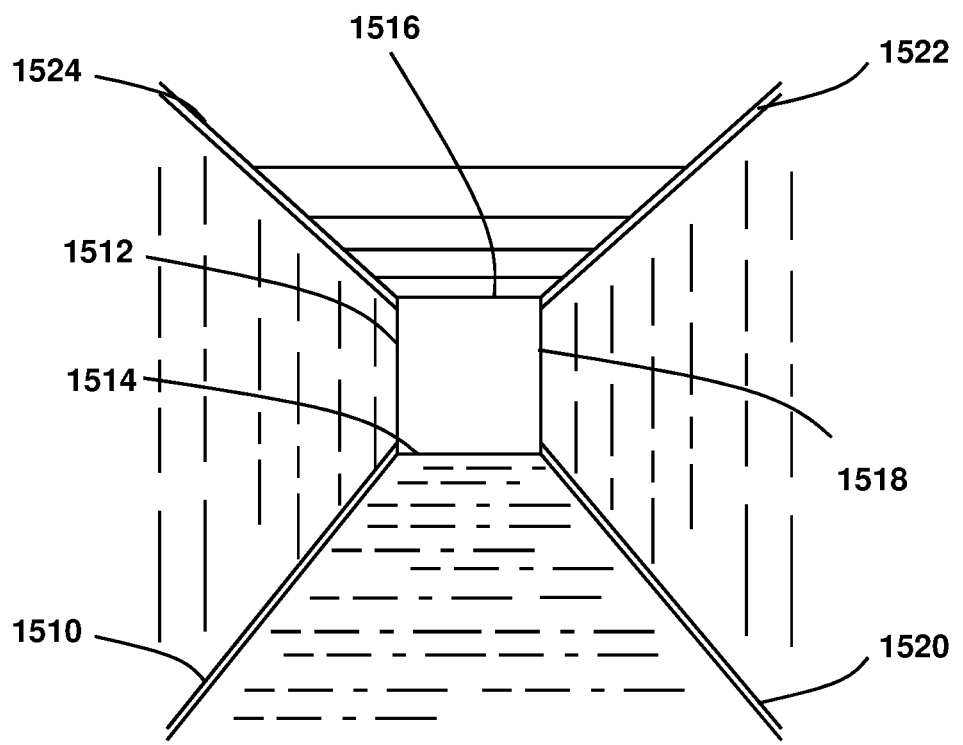
FIG. 15 is a front perspective view of an empty container in which edge detection may be used to define the edges of planes configuring the interior of the container.

Reference is now made to FIG. 15. In the embodiment of FIG. 15, a reference baseline may be created with an empty trailer. In this case, a camera may take an image and an image processor may then determine edges for such container. In particular, typical containers are a rectangular prism with known dimensions. The edges between the planes on the interior of the rectangular prisms may be detected using image processing either at the computing device on the trailer or at the computing device on a server. Thus, in accordance with FIG. 15, edges 1510, 1512, 1514, 1516, 1518, 1520, 1522 and 1524 may be found.

Thereafter, when there is a load in the trailer, for example a box on the floor, an image may be taken. Such box will block some of the edges and the algorithm can perform edge detection and estimate the loading percentage by the length of the edges and locations that are blocked. Further, the image may also be provided to customers needing to know the type of load that is in the trailer.

Figure 16:
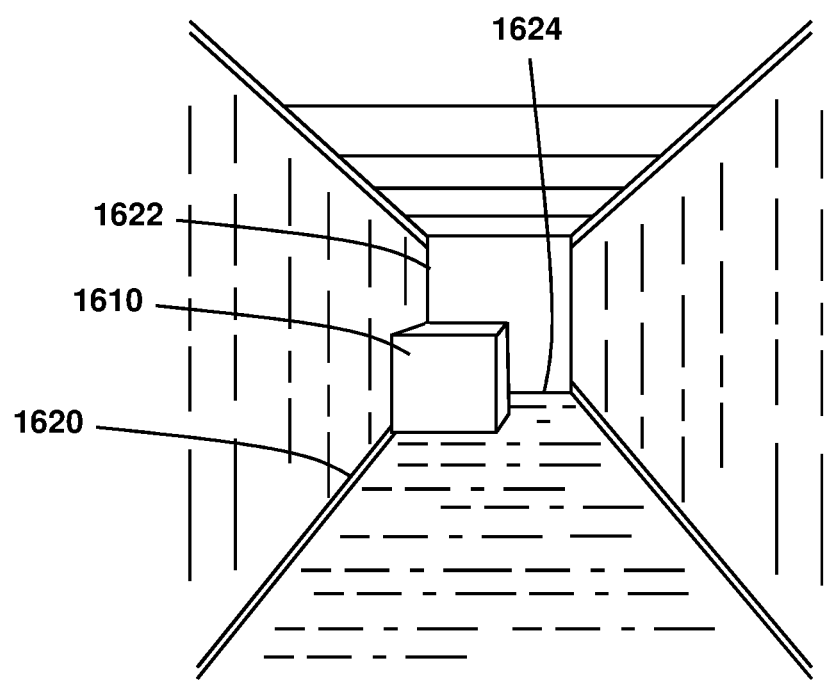
FIG. 16 is a front perspective view of a loaded container in which edge detection may be used to define disrupted edges of planes configuring the interior of the container.

Thus, reference is made to FIG. 16. As seen in FIG. 16, a load 1610 blocks part of edge 1620. Based on the length of edge 1620 and the proportion of such edge that has been blocked, the size and location of the load may be determined.

Further, edges 1622 and 1624 are also partially blocked, and the algorithm may further use this information to determine the size and location of the load.

Specifically, the computing device associated with the camera may utilize the process of FIG. 12 above to capture an image and either forward the image or perform processing.

Further, the processing of the image itself could utilize the proportions of the edges for individual edges that are blocked to determine the loading of the trailer.

Based on the above, an image based processing technique is provided to use edges to find cargo loading in a container or trailer.

A server such as servers 240, 242 or 250 may be any network node. For example, one simplified server that may perform the embodiments described above is provided with regards to FIG. 17.

Figure 17:
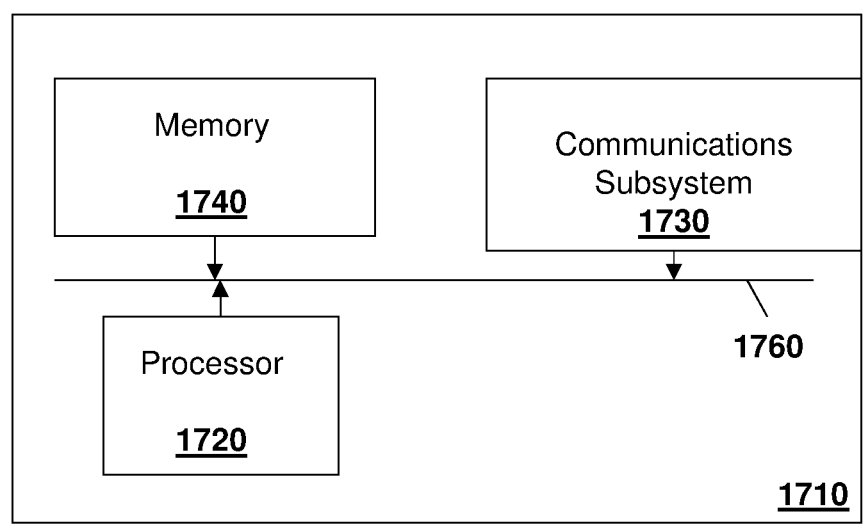
FIG. 17 is a block diagram of an example computing device or server capable of being used with the embodiments of the present disclosure.

In FIG. 17, server 1710 includes a processor 1720 and a communications subsystem 1730, where the processor 1720 and communications subsystem 1730 cooperate to perform the methods of the embodiments described herein.

The processor 1720 is configured to execute programmable logic, which may be stored, along with data, on the server 1710, and is shown in the example of FIG. 17 as memory 1740. The memory 1740 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 1720 may also be implemented entirely in hardware and not require any stored program to execute logic functions.

Alternatively, or in addition to the memory 1740, the server 1710 may access data or programmable logic from an external storage medium, for example through the communications subsystem 1730.

The communications subsystem 1730 allows the server 1710 to communicate with other devices or network elements.

Communications between the various elements of the server 1710 may be through an internal bus 1760 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products. In some cases, functions may be performed entirely in hardware and such a solution may be the functional equivalent of a software solution.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

For example, various example clauses are provided below.

AA. A method for cargo load detection in a container by a computing device, the method comprising: projecting at least one light dot within an array of light dots towards a surface of the container; capturing an image of the at least one light dot on the surface of the container; and using the captured image to determine cargo loading within the container.

BB. The method of clause AA, wherein the using comprises sending the captured image to a server to calculate distortion of the at least one light dot compared to a reference image of the at least one light dot captured in an empty container.

CC. The method of clause AA, wherein the using comprising: determining, at the computing device, a first distance from a location of the at least one light dot in the captured image and a location of the at least one light dot in a reference image; finding a second distance from the location of the at least one light dot in the reference image and a location of a reference dot; and calculating the distance from the light array projection to the cargo load based on the first distance and second distance.

DD. The method of any one of clauses AA to CC, further comprising compiling distances from each light dot in the array of light dots to determine cargo loading.

EE. The method of any one of clauses AA to DD, wherein the projecting comprises illuminating all of the light dots in the array of light dots simultaneously.

FF. The method of any one of clauses AA to DD, wherein the projecting comprises: illuminating a subset of light dots within the array of light dots; waiting until an image is captured; and illuminating a second subset of light dots within the array of light dots.

GG. The method of clause FF, wherein the subset of light dots comprises a single light dot.

HH. The method of any one of clauses AA to GG, further comprising: projecting at least one light dot within an array of light dots towards a second surface of the container; capturing a second image of the at least one light dot within the array of light dots on the second surface of the container; and using the captured image and the second image to determine cargo loading volume within the container.

II. The method of any one of clauses AA to HH, wherein the projecting is performed based on a trigger being received at the computing device.

JJ. The method of clause II, wherein the trigger comprises at least one of: a command from a server; a door closing event on the container; a vibration event on the container; a timer event; or a light detection event on the container.

KK. The method of any one of clauses AA to JJ, further comprising: detecting edges within the captured image; comparing the detected edges with edges in a reference image; and using a difference in the detected edges and the edges in the reference image to determine cargo loading within the container.

LL. A computing device for cargo load detection in a container, the computing device comprising: a processor; and a communications subsystem, wherein the computing device is configured to: project at least one light dot within an array of light dots towards a surface of the container; capture an image of the at least one light dot on the surface of the container; and use the captured image to determine cargo loading within the container.

MM. The computing device of clause LL, wherein the computing device is configured to use the captured image to determine cargo loading by sending the captured image to a server to calculate distortion of the at least one light dot compared to a reference image of the at least one light dot captured in an empty container.

NN. The computing device of clause LL, wherein the computing device is configured to use the captured image to determine cargo loading by: determining, at the computing device, a first distance from a location of the at least one light dot in the captured image and a location of the at least one light dot in a reference image; finding a second distance from the location of the at least one light dot in the reference image and a location of a reference dot; and calculating the distance from the light array projection to the cargo load based on the first distance and second distance.

OO. The computing device of any one of clauses LL to NN, wherein the computing device is further configured to compile distances from each light dot in the array of light dots to determine cargo loading.

PP. The computing device of any one of clauses LL to OO, wherein the computing device is configured to project by illuminating all of the light dots in the array of light dots simultaneously.

QQ. The computing device of any one of clauses LL to OO, wherein the computing device is configured to project by: illuminating a subset of light dots within the array of light dots; waiting until an image is captured; and illuminating a second subset of light dots within the array of light dots.

RR. The computing device of clause QQ, wherein the subset of light dots comprises a single light dot.

SS. The computing device of any one of clauses LL to RR, wherein the computing device is further configured to: project at least one light dot within an array of light dots towards a second surface of the container; capture a second image of the at least one light dot within the array of light dots on the second surface of the container; and use the captured image and the second image to determine cargo loading volume within the container.

TT. The computing device of any one of clauses LL to SS, wherein the computing device is configured to project based on a trigger being received at the computing device.

UU. The computing device of clause TT, wherein the trigger comprises at least one of: a command from a server; a door closing event on the container; a vibration event on the container; a timer event; or a light detection event on the container.

VV. The computing device of any one of clauses LL to UU, wherein the computing device is further configured to: detect edges within the captured image; compare the detected edges with edges in a reference image; and use a difference in the detected edges and the edges in the reference image to determine cargo loading within the container.

WW. A computer readable medium for storing instruction code for cargo load detection in a container, the instruction code, when executed by a processor of the computing device causing the computing device to: project at least one light dot within an array of light dots towards a surface of the container; capture an image of the at least one light dot on the surface of the container; and use the captured image to determine cargo loading within the container.

The invention claimed is:

1. A method for cargo load detection in a container by a computing device, the method comprising:
    capturing a first image of an interior of the container when the container is empty;
    detecting a first set of edges within the first image;
    capturing a second image of the interior of the container;
    detecting a second set of edges within the second image; and
    determining cargo loading within the container by comparing the first set of edges with the second set of edges, the comparing comprising determining that a missing portion of at least one edge within the first set is missing from the second set, wherein the determining is based on a ratio of a length of the missing portion to a length of the at least one edge.

2. The method of claim 1, wherein the determining is based on a length of the missing portion.

3. The method of claim 1, wherein the determining is based on a location of the missing portion.

4. The method of claim 1, wherein the determining identifies a size and a location of a load.

5. The method of claim 1, further comprising transmitting the second image to a server;
wherein the server performs the determining.

6. The method of claim 1, wherein the first image and the second image are captured by a camera located at a rear of the container projecting forward.

7. The method of claim 1, wherein the first image and the second image are captured by a camera located at a front of the container projecting backwards.

8. A computing device for cargo load detection in a container, the computing device comprising:
a processor; and
a communications subsystem;
wherein the computing device is configured to:
capture a first image of an interior of the container when the container is empty;
detect a first set of edges within the first image;
capture a second image of the interior of the container;
detect a second set of edges within the second image; and
determine cargo loading within the container by comparing the first set of edges with the second set of edges, the comparing comprising determining that a missing portion of at least one edge within the first set is missing from the second set, wherein the determining is based on a ratio of a length of the missing portion to a length of the at least one edge.

9. The computing device of claim 8, wherein the determining is based on a length of the missing portion.

10. The computing device of claim 8, wherein the determining is based on a location of the missing portion.

11. The computing device of claim 8, wherein the determining identifies a size and a location of a load.

12. The computing device of claim 8, wherein the computing device is further configured to transmit the second image to a server;
wherein the server performs the determining.

13. The computing device of claim 8, wherein the first image and the second image are captured by a camera located at a rear of the container projecting forward.

14. The computing device of claim 8, wherein the first image and the second image are captured by a camera located at a front of the container projecting backwards.

15. A non-transitory computer-readable medium having stored thereon executable code for execution by a processor of a computing device, the executable code comprising instructions for
capturing a first image of an interior of the container when the container is empty;
detecting a first set of edges within the first image;
capturing a second image of the interior of the container;
detecting a second set of edges within the second image; and
determining cargo loading within the container by comparing the first set of edges with the second set of edges, the comparing comprising determining that a missing portion of at least one edge within the first set is missing from the second set, wherein the determining is based on a ratio of a length of the missing portion to a length of the at least one edge.

* * * * *